United States Patent [19]
Sasaki et al.

[11] Patent Number: 6,055,651
[45] Date of Patent: Apr. 25, 2000

[54] EMULATOR AND CORRESPONDING TRACE CONTROL METHOD

[75] Inventors: Hiroyuki Sasaki, Fucyu; Yoshikazu Aoto; Shuya Fujita, both of Koganei; Tatsuya Suzuki, Kawagoe, all of Japan

[73] Assignees: Hitachi, Ltd.; Hitachi Microcoputer System, Ltd., both of Tokyo, Japan

[21] Appl. No.: 08/763,318

[22] Filed: Dec. 10, 1996

[30] Foreign Application Priority Data

Dec. 12, 1995 [JP] Japan ................................. 7-322771

[51] Int. Cl.[7] ................................................ G06F 11/30
[52] U.S. Cl. .............................. 714/45; 714/39; 712/227
[58] Field of Search ............................. 395/568, 183.1, 395/183.15, 183.04, 183.21; 712/227; 714/34, 39, 28, 45

[56] References Cited

U.S. PATENT DOCUMENTS

| | | | |
|---|---|---|---|
| 4,480,317 | 10/1984 | Haag et al. ............................. | 702/67 |
| 4,636,940 | 1/1987 | Goodwin, Jr. ........................ | 395/183.15 |
| 4,835,675 | 5/1989 | Kawai ................................... | 395/183.21 |
| 5,345,580 | 9/1994 | Tamaru et al. ........................ | 395/500 |
| 5,347,649 | 9/1994 | Alderson .............................. | 395/183.21 |
| 5,513,317 | 4/1996 | Borchardt et al. ................... | 395/183.21 |
| 5,715,435 | 2/1998 | Ikei ....................................... | 395/568 |

FOREIGN PATENT DOCUMENTS

6-52013  2/1994  Japan .

OTHER PUBLICATIONS

*LSI Handbook*, edited by Institute of Electronics, Information and Communication Engineers, published by Ohm, Ltd.
IBM Technical Disclosure Bulletin, *Tailorable Embedded Event Trace*, vol. 34, No. 7B, Dec. 1991, pp. 259–261.
IBM Technical Disclosure Bulletin, *Comparator Logic to Assist Trace Facility for ROS Programs*, vol. 26, No. 3B, Aug., 1983, pp. 1566–1567.

*Primary Examiner*—Richard L. Ellis
*Attorney, Agent, or Firm*—Antonelli, Terry, Stout & Kraus, LLP

[57] ABSTRACT

A trace memory in the emulator is formed into a plurality of memory banks. Data to be traced is in principle stored sequentially in each memory bank. A trace condition setting circuit (trace registers) and a trace condition agreement detecting circuit (comparators) are provided to generate a valid/invalid flag FB indicating whether or not the data meet the set condition. This flag FB is stored along with the trace data in each memory bank.

7 Claims, 8 Drawing Sheets

EMULATOR AND CORRESPONDING TRACE CONTROL METHOD

BACKGROUND OF THE INVENTION

The present invention relates to data acquisition technology for a data processing system, and more specifically to technology that is most suitably applied to an emulator, a system evaluation apparatus using the same, a method of configuring trace memories used to acquire signals on a bus in an emulator and to a trace control method.

An emulator is used to make a detailed evaluation of a newly developed microcomputer-based system or microprocessor-based system (hereinafter referred to as a user system).

System evaluation apparatuses include, for example, an evaluation microcomputer or microprocessor that substitutively perform functions of a microcomputer or microprocessor used in the user system, and an in-circuit emulator having a trace memory for acquiring signals on a user system bus in a target user system, both being connected between a host computer such as a personal computer and the target user system. By executing a user program and an emulation program alternately, the system evaluation apparatuses analyze data that are stored in a trace memory while the user program is being executed, thus performing debugging.

In the emulator, there is a problem that if an address access time of the trace memory used to take in signals on the user system bus is relatively long compared with the operation frequency of the microcomputer or microprocessor to be used in the user system, the trace data may be lost. Japanese Patent Laid-Open No. 52013/1994 has proposed an emulator in which the trace memory is made up of a plurality of banks, and the data are stored alternately so as to prevent loss of trace data.

Because the memory capacity of the trace memory is finite and because the amount of data to be taken in per unit time has been increasing with the increasing operation frequency of the microcomputer or microprocessor, taking all the signals on the bus into the trace memory during the execution of the user program is not an appropriate technique to be used by an emulator. Thus it was proposed to set certain conditions (trace conditions) and store the signals on the bus in the trace memory only when the signals meet the trace conditions to reduce the amount of the data to be traced.

To meet these requirement, a trace system was proposed in which the trace memory is formed into two memory banks and data are stored alternately in each memory bank. Appropriate trace conditions are set up, and signals or data meeting the trace conditions are stored. However, there arises a problem that valid trace data such as the data meeting the trace conditions are not always stored alternately in the two memory banks of the trace memory. That is, the valid trace data are stored unevenly in one of the banks. Thus the order in which the trace data are stored in the two memory banks as the trace memory cannot be easily determined. Therefore, an appropriate debugging cannot be performed.

SUMMARY OF THE INVENTION

It is an object of the present invention to provide an emulator having a plurality of banks (or a plurality of memory banks) as a trace memory, wherein a trace memory configuration method and a trace control method are provided by which desired data can be efficiently stored in the trace memory.

It is another object of the present invention to provide an emulator having a plurality of banks (or a plurality of memory banks) as a trace memory, wherein a trace memory configuration method and a trace control method are provided by which data can be stored in the trace memory in such a way that the order in which the data have been taken in is not random.

It is yet another object of the present invention to provide an emulator including a plurality of memories as a trace memory that can store trace data so as to easily find the order in which the trace data have been taken in.

It is still yet another object of the present invention to provide an evaluation system having an emulator which includes a plurality of memories as a trace memory that can store trace data so as to easily find the order in which the trace data have been taken in.

According to the present invention, an emulator is provided including a trace memory which is formed into a plurality of memory banks; a control circuit for controlling accessing of the plurality of memory banks and being structured that the trace data are stored alternately and sequentially in each memory bank; trace and break control circuits provided for each memory banks, each having a trace condition setting circuit in which a trace conduction is set and a trace condition agreement detecting circuit which generates a bit or data (hereinafter referred to as a valid/invalid flag FB) representing whether or not signals or data to be traced meet the trace condition; and the flag FB which is stored in each back memory along with the trace signals or data.

With this arrangement, each memory bank is accessed only once for every several times, so that even when an address access time of the trace memory is long compared with the operation frequency of the microcomputer or microprocessor, it is possible to take in signals or data on the bus without losing data.

Furthermore, because the trace data is attached with the valid/invalid flag FB when stored, the order in which the data has been stored in the banks of the trace memory is prevented from being lost.

Further, the addresses of each memory bank are generated by a common counter such as an address counter provided in the control circuit, whose value is updated when valid data are stored in either of the banks and not updated when invalid data are stored in all memory banks. This prevents many invalid data from being stored in the trace memory, thus improving the efficiency of utilization of the trace memory.

BRIEF DESCRIPTION OF THE DRAWINGS

The present invention will be more apparent from the following detailed description, when taken in conjunction with the accompanying drawings, in which.

DETAIL DESCRIPTION OF THE PREFERRED EMBODIMENTS

Now, one embodiment of the present invention will be described in detail.

Figure 1:
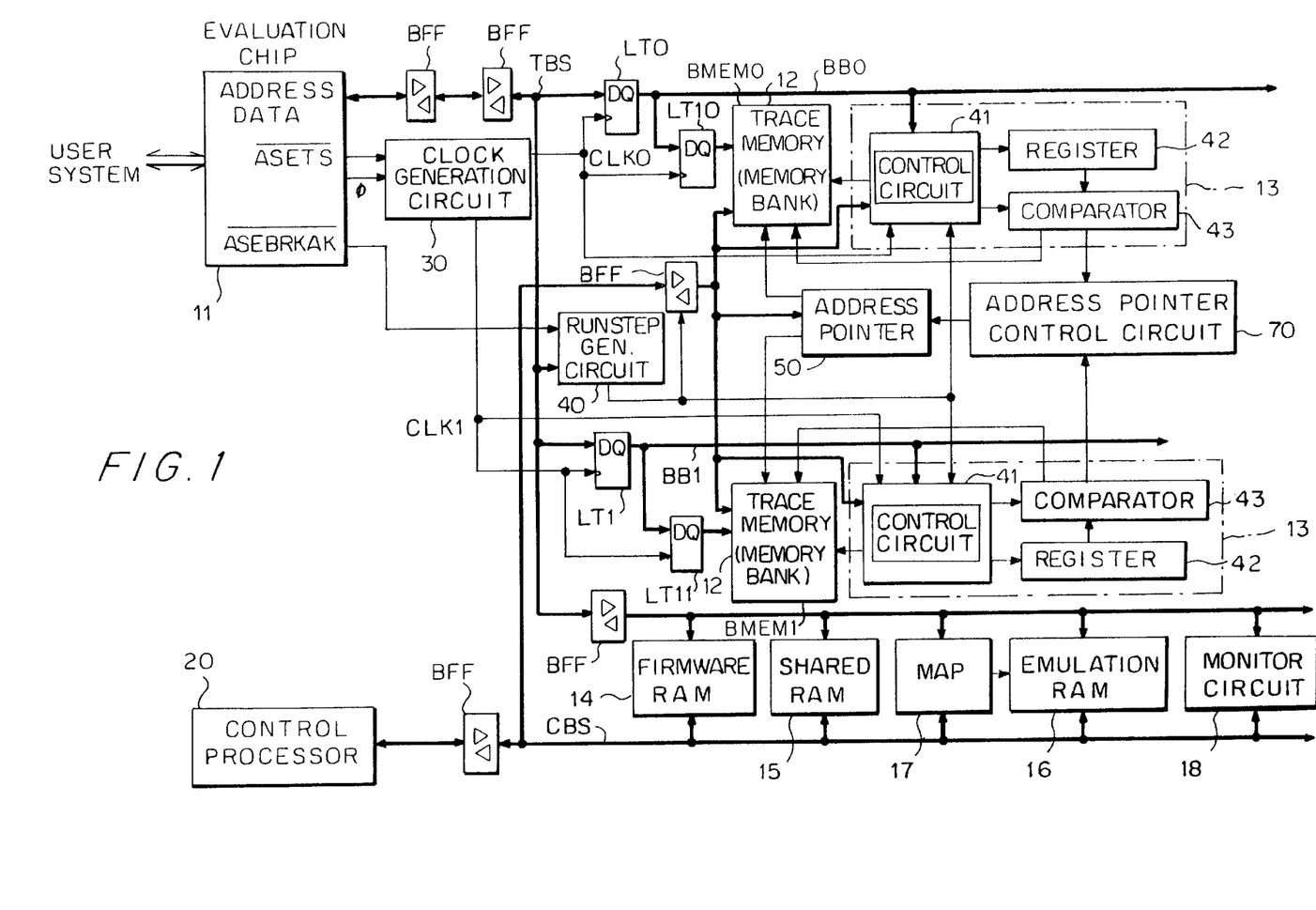
FIG. 1 is a block diagram illustrating one example of an emulator of the present invention.

FIG. 1 illustrates an example of the configuration of an emulator according to the present invention.

In FIG. 1, reference numeral 11 denotes an evaluation chip incorporating a microcomputer or microprocessor having the same function as a microcomputer or microprocessor used in a user system to be developed. Numeral 20 denotes a control processor that controls the whole emulator and performs data communication with a host computer 80 shown in FIG. 6. Numeral 12 denotes memory banks as trace memories or trace circuits, each of which samples and stores data or signals presented on a trace bus TBS and stores them therein. Numeral 13 denotes trace and break control circuits in which a trace condition and a break condition are set so as to start the trace operation when the trace condition is met, and to stop execution of the user program when the break condition is met. That is, the trace and break control circuits 13 control start of the trace operation and stop of the execution of the user program by monitoring signals or data appearing on bank buses BB0 and BB1 during a period when the user program is being executed by the evaluation chip 11. Although a pair of the trace and break control circuits 13 are provided, the same trace condition and the same break condition are set into both trace and break control circuits 13. Numeral 14 denotes a firmware RAM (Random Access Memory) that stores an emulation control program to realize emulation and various debugging functions. Reference numeral 15 represents a shared RAM as a parallel communication means for performing communication between the evaluation chip 11 and the control processor 20. Reference numeral 16 presents an emulation RAM as a lending memory which is used when a sufficient memory capacity is not available in the user system or used to store a program developed by the user. Reference numeral 17 represents an address map control circuit that allows the emulation RAM 16 to be allocated at an arbitrary location in an address space. Reference numeral 18 represents a monitor circuit formed of registers or memory circuits that take in address signals and interrupt signals outputted on the trace bus TBS during the execution of the user program in real time. The control processor 20 refers to this monitor circuit 18 to check the user program execution state at any time. The control processor 20 is a control device having the same configuration as the so-called microprocessor and is formed in a single semiconductor chip.

The emulator of this embodiment has the trace bus TBS which is connected to the evaluation chip 11 and on which signals or data from the user system are placed, and a CPU bus CBS connected to the control processor 20. The memory circuits 12, 14, 15, 16 and 18 are each connected to the trace buses TBS and the CPU bus CBS and can be accessed either by the evaluation chip 11 or the control processor 20. Symbol BFF designates bus buffer circuits provided on the buses TBS and CBS, each of which has the function to connect and disconnect the corresponding bus. Symbol LT0, LT1, LT10 and LT11 each designates a latch circuit formed of a D-type flip-flop circuit that can latch signals on the trace bus TBS. The trace bus TBS includes a data bus for 32-bit data signals, an address bus for 24-bit address signals, and a control bus for a variety of control signals and status signals. In FIG. 1, the CPU bus CBS is also shown as an integral bus including the address bus, data bus and control bus.

In the emulator of this embodiment, the trace memory 12 is formed into two memory banks (a first and a second memory bank) BMEM0 and BMEM1. For these memory banks BMEM0 and BMEM1, there are two sets of or a pair of trace and break control circuits 13. The emulator also has a common address pointer (an address counter) 50 for the two memory banks BMEM0 and BMEM1, and an address pointer control circuit 70 that controls the common address pointer 50 according to signals from the trace and break control circuits 13.

A clock generation circuit 30 produces clocks CLK0 and CLK1 to cause the memory banks BMEM0 and BMEM1 to alternately acquire or take in signals on the trace bus TBS. A signal generation circuit 40 generates a control signal $\overline{\text{RUNSTEP}}$ for the clock generation circuit 30 and the trace and break control circuit 13 according to a signal $\overline{\text{ASEBRKAK}}$ representing whether the emulator is executing the user program output from the evaluation chip 11 or the emulation program. The timings of the signal $\overline{\text{ASEBRKAK}}$ and the control signal $\overline{\text{RUNSTEP}}$ are almost the same. The signal generation circuit 40 includes a flag or register that indicates whether or not the emulator is in a mode in which the user program is executed one instruction at a time.

Figure 2:
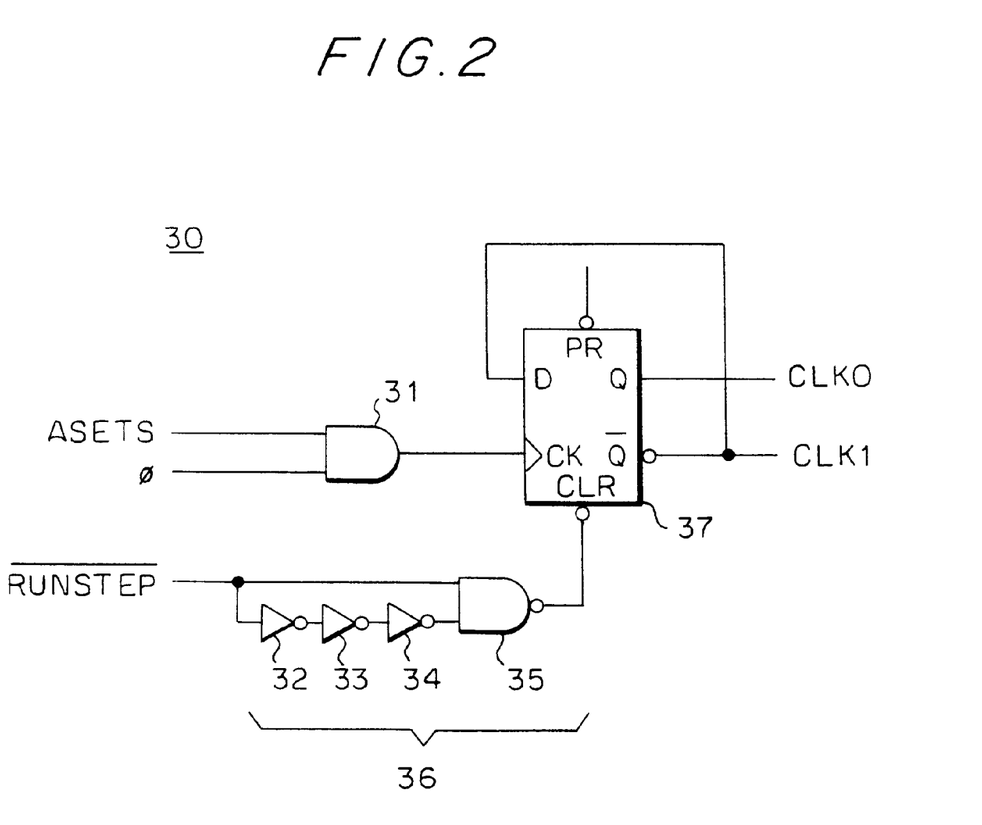
FIG. 2 is an example of the logic configuration of a clock generation circuit in the emulator of FIG. 1.
Figure 3:
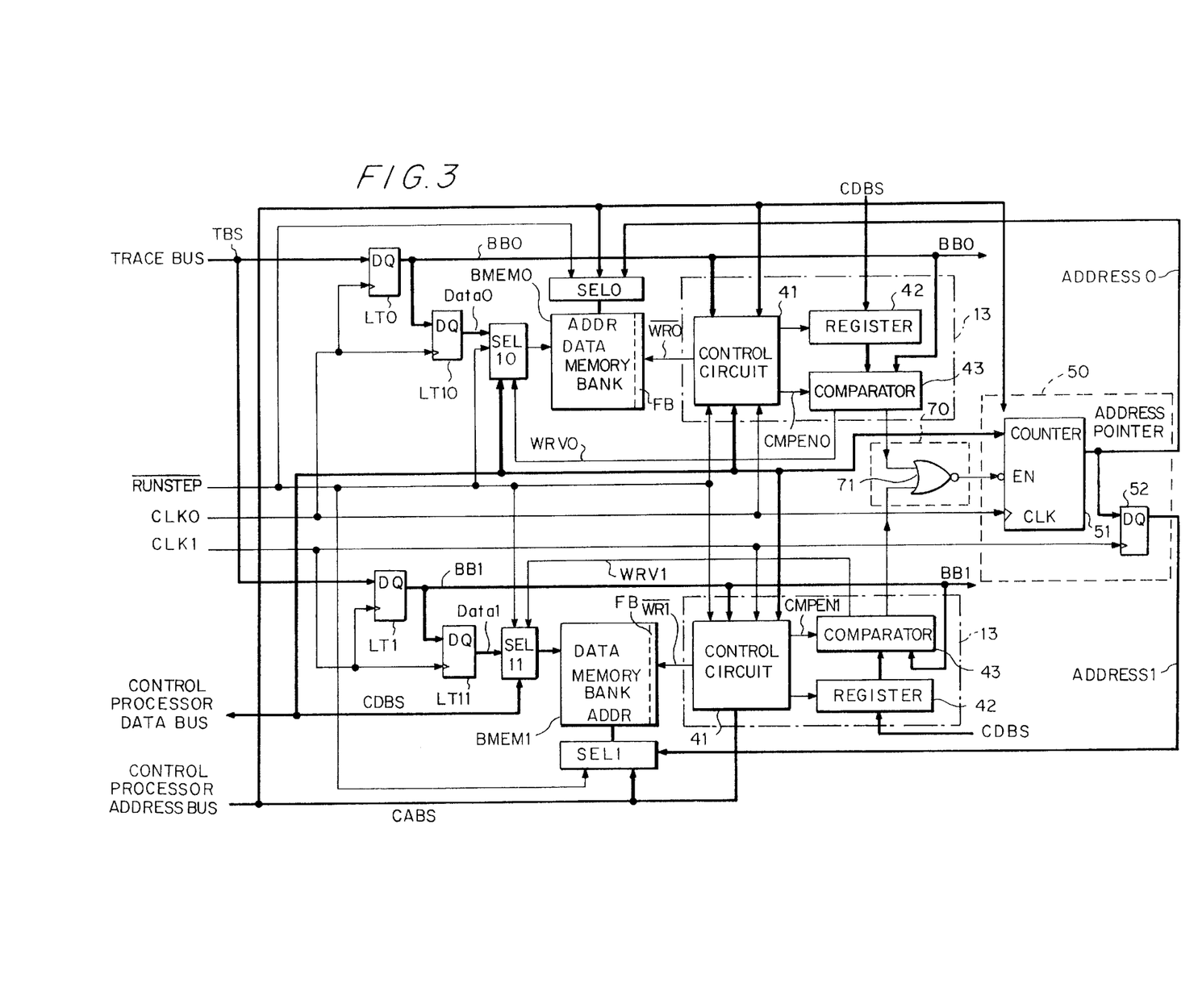
FIG. 3 is a block diagram illustrating details of the emulator of FIG. 1.

FIG. 2 illustrates an embodiment of the clock generation circuit 30, and FIG. 3 illustrates details of the trace memory 12 and the trace and break control circuit 13.

The clock generation circuit 30 shown in FIG. 2 includes an AND gate 31, a one-shot pulse generation circuit 36 and a D-type flip-flop 37. The AND gate 31 takes in a signal $\overline{\text{ASEETS}}$ representing the validity of the signals on the trace bus TBS output from the evaluation chip 11 and a reference clock φ. The one-shot pulse generation circuit 36 comprises inverters 32, 33 and 34 and a NAND gate 35. The D-type flip-flop 37 receives a pulse generated by the one-shot pulse generation circuit 36 at its clear terminal CLR and the output signal of the AND gate 31 at its clock terminal CK, and has its inverted output terminal $\overline{Q}$ feed-back connected to its data terminal D. The flip-flop 37 outputs clocks CLK0 and CLK1 in opposite phases from its output terminals Q and $\overline{Q}$. The one-shot pulse generation circuit 36 generates one-shot pulses upon detecting the trailing edge of the control signal $\overline{\text{RUNSTEP}}$ from the signal generation circuit 40 which represents whether the emulator is executing the user program or the emulation program.

The trace and break control circuits 13, as shown in FIG. 3, each includes: a register 42, as a trace condition setting circuit, that is set a trace condition and stores it; a comparator 43, as a trace condition agreement detecting circuit, which compares the signals on the bank bus BB0 (or BB1) coupled to the trace bus TBS via latch circuit LT0 (or LT1) with the trace condition set in the corresponding register 42 to check if they agree; and a control circuit 41 which generates a signal CMPEN0 (or CMPEN1) to allow the compare operation of the corresponding comparator 43 based on, for example, the $\overline{\text{RUNSTEP}}$ signal and the clock CLK0 (or CLK1) and a write control signal $\overline{\text{WR0}}$ (or $\overline{\text{WR1}}$) representing a timing at which data are written into the memory bank BMEM0 (or BMEM1). The signals CMPEN0 and CMPEN1 output from the control circuits 41 cause the comparators 43 to operate only when the control signal $\overline{\text{RUNSTEP}}$ output from the signal generation circuit 40 indicates that the emulator is executing the user program.

When comparator 43 detects agreement between the signals on the bank bus BB0 (or BB1) and the trace condition set in the corresponding register 42, the corresponding comparator 43 outputs a write validity signal WRV0 (or WRV1) to a selector SEL10 (or SEL11) provided before data input terminals of the memory bank BMEM0 (or BMEM1). This write validity signal is treated as write data. When the signals on the bank buses BB0 and BB1 are stored in the memory banks BMEM0 and BMEM1 via the selectors SEL10 and SEL11, data corresponding to the levels of the write validity signals WRV0 and WRV1 are written into a validity flag bit FB provided in the memory banks BMEM0 and BMEM1. The flag bit FB indicates whether the traced data read out from the bank bus BB0 (or BB1) into the memory bank BMEM0 (or BMEM1) is valid or invalid.

The trace and break control circuits 13 each includes, though not shown, a break register for setting the break condition to stop the execution of the user program, and a break comparator that compares the break condition set in the break register and the signals on the trace bus TBS. When they agree, the break comparator gives a user program execution break signal to the evaluation chip 11. Control signals for these break registers and break comparators are also generated by the control circuits 41.

In this embodiment, though not limited thereto, the address pointer control circuit 70 is formed of a NOR gate 71, and the address pointer 50 comprises a counter circuit 51 and a latch circuit 52. The output signals of the comparators 43 are fed to input terminals of the NOR gate 71, respectively, whose output signal is supplied to an enable terminal EN of the counter circuit 51. The counter circuit 51 receives at its clock terminal CLK the clock CLK0 and its value is updated in synchronism with the clock CLK0 when the comparators 43 produce agreement detection signals.

When the trace condition for one of either the first bank side for the first memory bank BMEM0 and the second bank side for the second memory bank BMEM1 is met, the value of the counter circuit 51 is updated by one. Because the updating is performed in synchronism with only the clock CLK0, the value of the address pointer 50 is updated by only one, not two, even when the trace condition for both the first and second bank sides is satisfied. Further, even when the value of the counter circuit 51 is updated by the agreement signal of the comparator 43 for the first bank side, the trace data is not stored at the updated address in the second memory bank BMEM1 because the value of the counter circuit 51 is supplied through the latch circuit 52 that latches in synchronism with the clock CLK1.

The registers 42 are connected to a CPU data bus CDBS to allow the control processor 20 to set the same trace condition via the CPU bus CBS. The counter circuit 51 is also connected to the CPU data bus CDBS so that the control processor 20 can read its value. The registers 42 and counter circuit 51 are also connected to a CPU address bus CABS through a decoder (not shown) so that the control processor 20 can specify the registers 42 and the counter circuit 51. The control processor 20 specifies the registers 42 and performs the setting by putting data on the CPU data bus CDBS. By specifying the counter circuit 51, it is possible for the control processor 20 to read its value.

Address input terminals of the first and second memory banks BMEM0 and BMEM1 are connected to the CPU address bus CABS and to the address pointer 50 via selectors SEL0 and SEL1, respectively, so as to be selectively supplied with the addresses from the address pointer 50 and with the addresses from the CPU address bus CABS. While the user program (emulation) is being executed, the first and second memory banks BMEM0 and BMEM1 are supplied with the addresses from the counter circuit 51 and latch circuit 52, respectively. When the emulation is stopped, the addresses on the CPU address bus CABS are supplied to the first and second memory banks BMEM0 and BMEM1 via selectors SEL0 and SEL1. On the other hand, data input terminals of the first and second memory banks BMEM0 and BMEM1 are selectively connected to the first and second bank buses BB0 and BB1 and the CPU data bus CDBS via the selectors SEL10 and SEL11. The first and second bank buses BB0 and BB1 are connected to the trace bus TBS via the latch circuits LT0 and LT1. While the user program is being executed, signals on the first and second bank buses BB0 and BB1 are supplied to the first and second memory banks BMEM0 and BMEM1 for tracing. When the emulation is not performed, the first and second memory banks BMEM0 and BMEM1 are connected to the CPU data bus CDBS, so that the control processor 20 can read the trace data in the first and second memory banks BMEM0 and BMEM1.

In this embodiment, though not limited thereto, the signals on the trace bus TBS are latched by latch circuits LT0 and LT1, respectively, in synchronism with the opposite-phase clocks CLK0 and CLK1, and then put out on the first and second bank buses BB0 and BB1. The signals on the first and second bank buses BB0 and BB1 are then latched by the latch circuits LT10 and LT11, which perform latching operations in synchronism with the clocks CLK0 and CLK1, respectively, and are supplied to the first and second memory banks BMEM0 and BMEM1 through the selectors SEL10 and SEL11.

Since the signals on the trace bus TBS are supplied to the memory bank BMEM0 (BMEM1) through two latch circuits LT0 and LT10 (LT1 and LT11), this simplifies the design of the timings at which data are written into the memory banks BMEM0 and BMEM1. Because the clocks CLK0 and CLK1 are in opposite phases, the signals on the trace bus TBS are taken in by the latch circuits LT0 and LT1 alternately in time series and are then supplied, with a one-clock delay, into the corresponding memory banks BMEM0 and BMEM1 via the Latch circuits LT10 and LT11.

Namely, circuits 30, LT1, LT0, LT10, LT11, 50, 70 and so on are regarded as a control circuit for controlling accessing of the plurality of memory banks so as to store the trace data alternately and sequentially in each memory bank.

Figure 4:
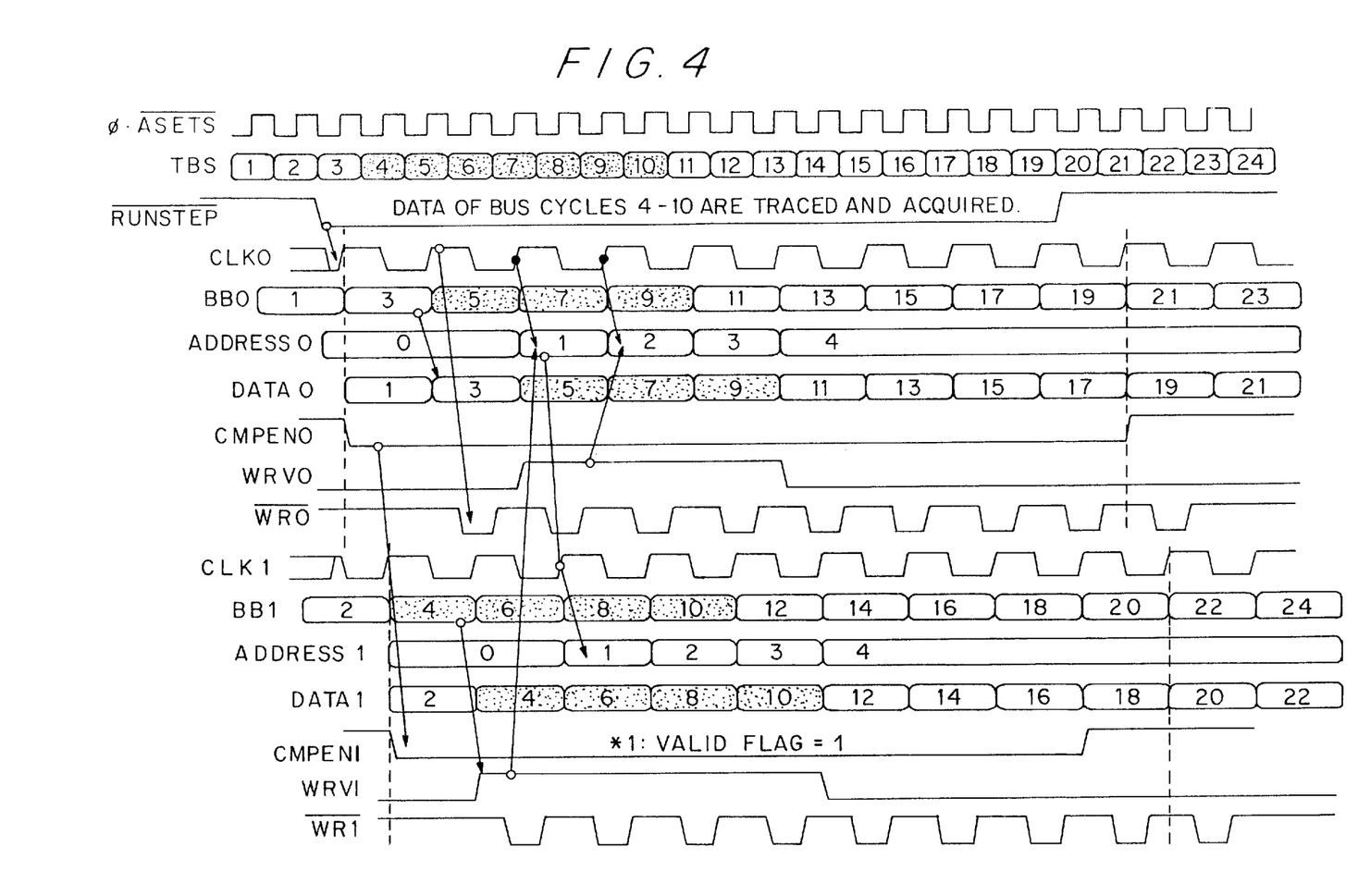
FIG. 4 is a time chart illustrating an example of trace timing in the emulator of FIG. 1.
Figure 5:
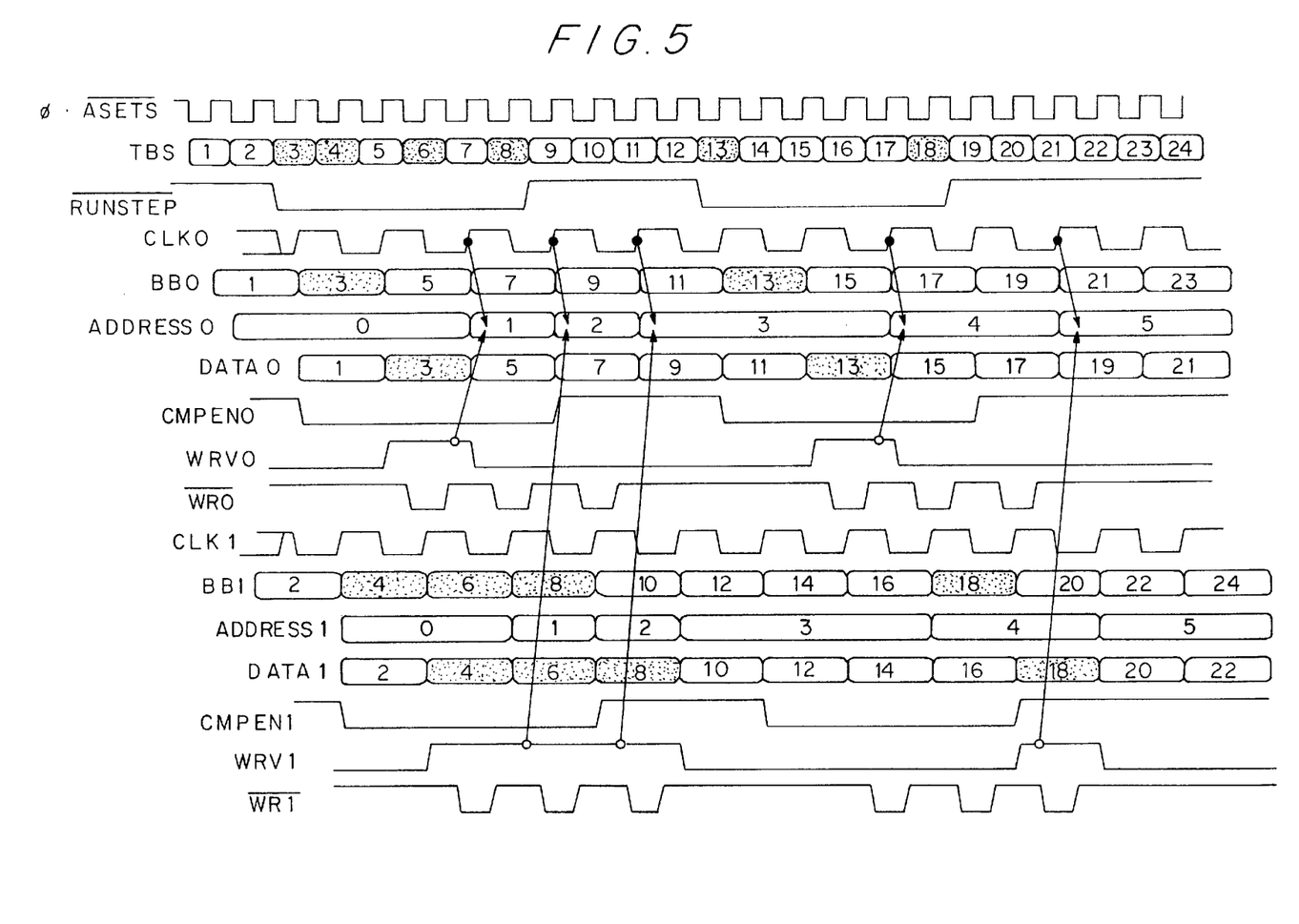
FIG. 5 is a time chart illustrating another example of trace timing in the emulator of FIG. 1.

FIGS. 4 and 5 illustrate examples of timings for tracing signals on the trace bus TBS.

FIG. 4 illustrates the timings at which signals or data in fourth to tenth bus cycles of the trace bus TBS are taken into the first and second memory banks BMEM0 and BMEM1 when they meet the trace condition. When the control signal $\overline{\text{RUNSTEP}}$ changes from high level to low level at the time when the bus cycle changes from second to third, the clocks CLK0 and CLK1 start to be generated. The clocks CLK0 and CLK1 activate the latch circuits LT0 and LT1, alternately, which in turn send the signals on the trace bus TBS to the first and second bank buses BB0 and BB1, alternately. According to the clocks CLK0 and CLK1, the control circuit 41 generates the write control signals $\overline{\text{WR0}}$ and $\overline{\text{WR1}}$ with a one-clock delay and supplies them to the memory banks BMEM0 and BMEM1, respectively. A control signal CMPEN0 changes to low level in synchronism with the first leading edge of the clock CLK0 and a control signal CMPEN1 changes to low level in synchronism with the first leading edge of CLK1, starting the comparison operations of the corresponding comparators 43.

Then, the output signal WRV1 of the comparator 43 on the second bank side for the second memory bank BMEM1 goes to a high level indicating that the conditions are met. This causes "1" to be written in the valid/invalid flag bit FB field of the second memory bank BMEM1 as shown in Table 1, and at the same time data(a count value) in the counter circuit 51 is updated from "0" to "1" in synchronism with the bank clock CLK0. The value ("1") of the counter circuit 51 is sent to the first memory bank BMEM0 through the selector SEL0 to cause the signals on the first bank bus BB0 (signals or data in fifth trace bus cycle) to be stored at that address of the first memory bank BMEM0. At the same time, the value ("1") of the counter circuit 51 is latched into the latch circuit 52 synchronism with the leading edge of the clock CLK1, and supplied through the selector SEL1 to the second memory bank BMEM1 causing the signals on the bank bus BB1 (signals or data in sixth trace bus cycle) to be stored in that address of the second memory bank BMEM1. At this time, because the comparators 43 detect the condition agreement on both bank sides, data "1" is written in the valid/invalid flag bit FB of each memory bank BMEM0 and BMEM1, and the value of the counter circuit 51 is updated from "1" to "2".

TABLE 1

| Address pointer | Memory bank 0 (BMEM0) | | Memory bank 1 (BMEM1) | |
|---|---|---|---|---|
| | | (FB) | | (FB) |
| 5 | | | | |
| 4 | (19) | 0 | (20) | 0 |
| 3 | 9 | 1 | 10 | 1 |
| 2 | 7 | 1 | 8 | 1 |
| 1 | 5 | 1 | 6 | 1 |
| 0 | (3) | 0 | 4 | 1 |

When, by repeating the above operations, the tracing for the signals of bus cycle 10 is ended, the output signals WRV0 and WRV1 of the comparators 43 change to the low level indicating the condition disagreement. Hence, from the bus cycle 11 onward, the value of the counter circuit 51 remains "4" and is not updated, causing the signals on the bank buses BB0 and BB1 to be written over at the same addresses in the memory banks BMEM0 and BMEM1. As a result, the efficiency of utilization of the memory banks BMEM0 and BMEM1 as the trace memory improves.

FIG. 5 illustrates the timings at which signals of bus cycles 3, 4, 6, 8, 13 and 18 of the trace bus TBS, which meet the trace condition, are stored into the trace memory (BMEM0 and BMEM1). In FIG. 5, a period when the control signal $\overline{\text{RUNSTEP}}$ is at a low level indicates the user program execution status that requires tracing, and bus cycles 9 to 12 when the signal $\overline{\text{RUNSTEP}}$ is at a high level indicates the emulation program execution status.

In FIG. 5, when the bus cycle switches from second to third, the signal $\overline{\text{RUNSTEP}}$ changes from high level to low level, causing the clocks CLK0 and CLK1 to be generated. The clocks CLK0 and CLK1 actuate the latch circuits LT0 and LT1, which send signals on the trace bus TBS to the first and second bank buses BB0 and BB1, alternately. Synchronously with the bank clocks CLK0 and CLK1, the control circuit 41 generates the write control signals $\overline{\text{WR0}}$ and $\overline{\text{WR1}}$ with a one-clock delay and sends them to the memory banks BMEM0 and BMEM1, respectively. Further, the control signal CMPEN0 changes to low level in synchronism with the first leading edge of the bank clock CLK0, and the control signal CMPEN1 changes to low level in synchronism with the first leading edge of CLK1, starting the compare operations of the corresponding comparators 43.

Then, when the signals on the bank bus BB0 (signals or data of trace bus cycle 3) is stored into the memory bank BMEM0, the output signal WRV0 of the comparator 43 on the first bank side changes to high level representing the condition agreement. This causes "1" to be written in the valid/invalid flag bit FB of the memory bank BMEM0 as shown in Table 2, and at the same time the value of the counter circuit 51 is updated from "0" to "1" in synchronism with the bank clock CLK0. At this time, because the latch circuit 52 holds the previous value of the counter circuit 51 (address "0") and this value is sent through the selector SEL1 to the memory bank BMEM1, the signals on the bank bus BB1 (signals or data of trace bus cycle 4) is stored at the previous address "0". At this time, the output signal WRV1 of the comparator 43 on the second bank side changes to high level representing the condition agreement. This causes "1" to be written in the valid/invalid flag bit FB of the memory bank BMEM1 as shown in Table 2.

TABLE 2

| Address pointer | Memory bank 0 (BMEM0) | | Memory bank 1 (BMEM1) | |
|---|---|---|---|---|
| | | (FB) | | (FB) |
| 5 | | | | |
| 4 | (17) | 0 | 18 | 1 |
| 3 | 13 | 1 | (14) | 0 |
| 2 | (7) | 0 | 8 | 1 |
| 1 | (5) | 0 | 6 | 1 |
| 0 | 3 | 1 | 4 | 1 |

The updated value (address "1") of the counter circuit 51 is supplied via the selector SEL0 to the memory bank BMEM0 to cause the signals on the bank bus BB0 (signals of trace bus cycle 5) to be stored at that address ("1"). At the same time, the updated value of the counter circuit 51 is also latched into the latch circuit 52 in synchronism with the leading edge of the clock CLK1 and then supplied through the selector SEL1 to the memory bank BMEM1, causing the signals on the bank bus BB1 (signals or data of trace bus cycle 6) to be stored at that address ("1"). At this time, because the comparator 43 on the first bank side detects condition disagreement, "0" is written in the valid/invalid flag bit FB of the memory bank BMEM0 as shown in Table 2. Because the comparator 43 on the second bank side detects condition agreement, "1" is written in the valid/invalid flag bit FB of the memory bank BMEM1. Further, at this time the output signal WRV1 of the comparator 43 on the second bank side is held at a high level indicating the condition agreement, so that the value of the counter circuit 51 is updated from "1" to "2".

The updated value (address "2") of the counter circuit 51 is supplied to the memory bank BMEM0 through the selector SEL0, causing the signals on the bank bus BB0 (signals or data of trace bus cycle 7) to be stored at that address. At the same time, the updated value is also taken into the latch circuit 52 in synchronism with the leading edge of the clock CLK1 and then supplied to the memory bank BMEM1 through the selector SEL1, causing the signals on the bank bus BB1 (signals or data of trace bus cycle 8) to be stored at that address. At this time, the comparator 43 on the first bank side detects condition disagreement, so that "0" is written in the valid/invalid flag bit FB of the memory bank BMEM0. The comparator 43 on the second bank side, on the other hand, detects condition agreement, writing "1" into the valid/invalid flag bit FB of the memory bank BMEM1. Further, at this time, because the output signal WRV1 of the comparator 43 on the second bank side is held at a high level indicating the condition agreement, the value of the counter circuit 51 is updated from "2" to "3".

The updated value (address "3") of the counter circuit 51 is fed to the memory bank BMEM0 through the selector SEL0, causing the signals on the bank bus BB0 (signals or data of trace bus cycle 9) to be stored at that address. At the same time, the updated value is also taken into the latch circuit 52 in synchronism with the leading edge of the clock CLK1 and then fed to the memory bank BMEM1 through the selector SEL1, causing the signals on the bank bus BB1 (signals of trace bus cycle 10) to be stored at that address. At this time, because the control circuits 41 of the first and the second bank side both keep the write control signals $\overline{WR0}$ and $\overline{WR1}$ high in response to the low-to-high change of the control signal $\overline{RUNSTEP}$, data on the trace bus TBS is not taken into the memory banks BMEM0 and BMEM1. The output signals of the comparators 43 in the first bank and the second bank go to low levels indicating condition disagreement, so that the counter circuit 51 is not updated.

Then, when the signal $\overline{RUNSTEP}$ is changed from high to low when the bus cycle changes from "twelfth" to "thirteenth", the write control signals $\overline{WR0}$ and $\overline{WR1}$ output from the control circuits 41 on the first and the second bank side change from high to low, causing the signals of the bus cycle 13 to be stored in the memory bank BMEM0 and the output signal WRV0 of the comparator 43 to go to high levels indicating condition agreement. Hence, "1" is written in the valid/invalid flag bit FB of the memory bank BMEM0 and, at the same time, the value of the counter circuit 51 is updated from "3" to "4". On the other hand, if the signals 14 on the second bank bus BB1 do not meet the trace condition, the comparator 43 on the second bank side detects the disagreement, writing "0" into the valid/invalid flag bit of the memory bank BMEM1.

If signals that do not meet the trace condition appear successively in the trace bus cycle 15, 16 and 17, the comparators 43 on the first and the second bank detect the condition disagreement. As a result, both of the output signals WRV0 and WRV1 are made to go low levels indicating the condition disagreement, leaving the counter circuit 51 of the address pointer 50 un-updated. Hence, the signals on each bank bus BB0 (BB1) are written over at the same address in the memory banks BMEM0 and BMEM1.

When signals of bus cycle 18 meeting the trace condition are stored from the second bank bus BB1 to the memory bank BMEM1, the output signal WRV1 of the comparator 43 on the second bank side changes to high level indicating the condition agreement. This causes "1" to be written in the valid/invalid flag bit FB of the memory bank BMEM1, as shown in Table 2, and the value of the counter circuit 51 of the address pointer 50 to be updated from "4" to "5".

In this embodiment, as explained above, when valid trace signals or data are stored in either the first or second memory bank BMEM0 or BMEM1, the value of the address count in the address pointer is updated. When neither data in the first bank side nor in the second bank side meets the trace conditions, the value of the address counter is not updated, allowing the trace data to be written over at the same address. This improves the efficiency of utilization of the first and second memory banks as the trace memory.

Further, because for invalid data of the data stored in the first and second memory banks BMEM0 and BMEM1, "0" is written in the valid/invalid flag bit FB, the order in which the data is stored in the trace memory can be prevented from being lost. It is possible to retrieve only valid data for display.

Figure 6:
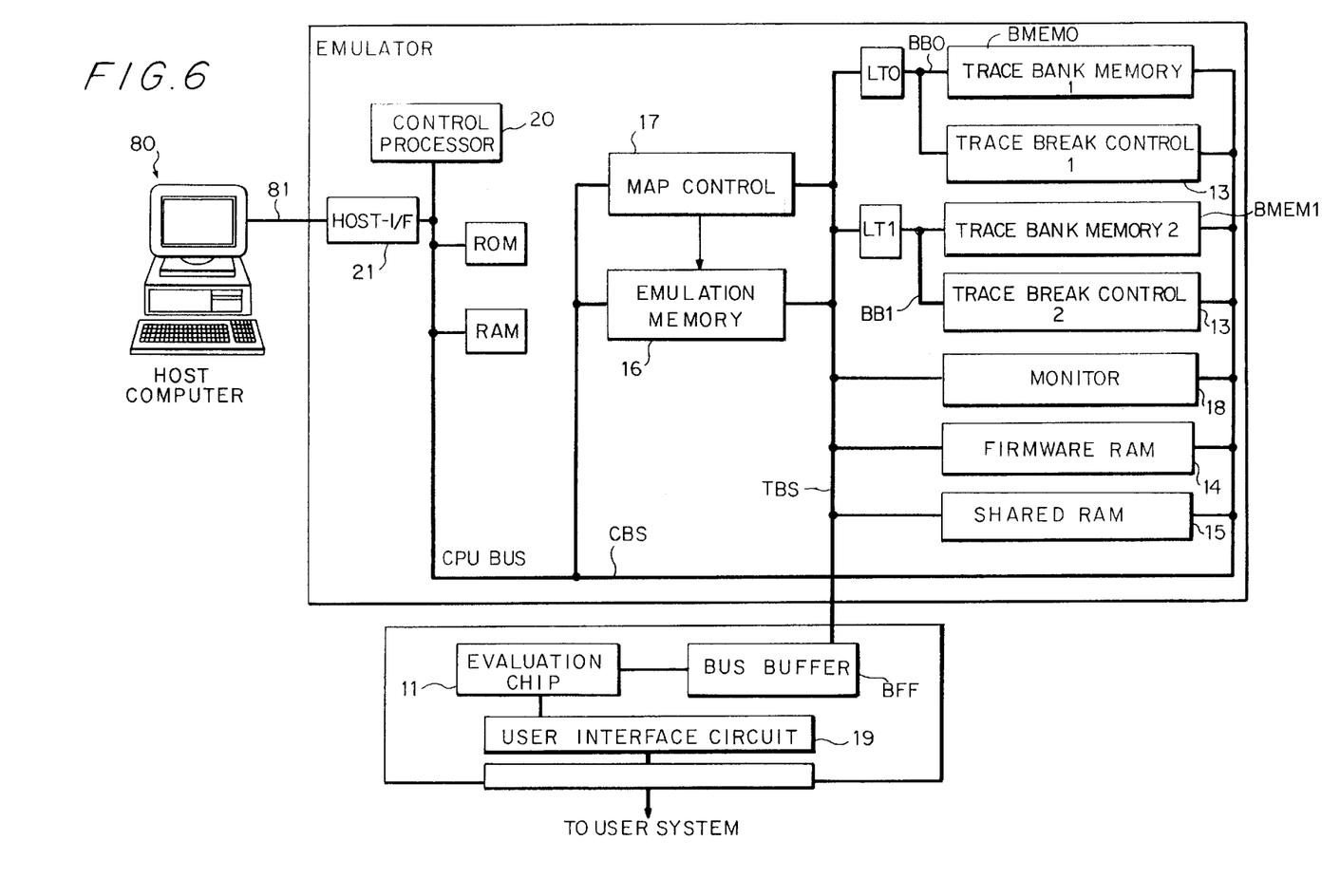
FIG. 6 is a block diagram illustrating the entire configuration of a system evaluation apparatus to which the emulator of the present invention is applied.

FIG. 6 illustrates an example of the overall configuration of a system evaluation apparatus using the emulator of this invention.

In FIG. 6, reference numeral 19 represents a user interface circuit for connecting the target user system and the emulator. To explain in more detail, a connector at the end of the cable led out from the user interface circuit 19 is connected to an MPU socket provided on a board installed in the user system. On the other hand, the CPU bus CBS is connected to a serial interface circuit (HOST-IF) 21, which is connected to one end of a serial communication cable 81 extending from the host computer 80 such as a personal computer.

In the system evaluation apparatus with the above configuration, an operator enters through the host computer a break condition at which the operator wishes to interrupt the execution of the program and the trace conditions at which the operator wishes to trace data, using address values and/or data values, and sets them in the break registers and the trace registers 42 in the trace and break control circuit 13. When a command is entered through the host computer 80, it is supplied through the serial communication cable 81 to the control processor 20. The control processor 20 decodes the command and, if it is a user program execution command, switches the bus buffer BFF so that the buffer circuits BFF in FIG. 1 between the evaluation chip 11 and the trace bus TBS and the buffer circuit BFF in FIG. 1 between the trace bus TBS and the bus that the firmware RAM and so on are connected are activated, and the buffer circuits BFF in FIG. 1 between the memory banks BMEM0 and BMEM1 and the CPU bus CBS is inactivated. At the same time, the control processor 20 gives the command through the shared RAM 15 to the evaluation chip 11, and the evaluation chip 11 then starts executing the user program. When a predetermined break point is reached, it is detected by the trace and break control circuit 13, the execution of the user program is stopped. In the mean time, signals on the trace bus TBS are sampled by the memory banks BMEM0 and BMEM1 and stored therein.

Next, when a command for displaying the contents of the traced data is entered through the host computer 80, the control processor 20 retrieves the traced data in the memory banks BMEM0 and BMEM1 and displays only the valid data in the memory banks BMEM0 and BMEM1 on the monitor screen of the host computer 80. Data debugging, therefore, can be made by analyzing the contents of the displayed data.

In the above embodiment, the trace bus TBS includes an address bus, a data bus and a control bus, and the number of bits of signals taken in each trace memory bank BMEM0 and BMEM1 at a time is close to 100 bits. The CPU bus CBS, on the other hand, has the data bus width of 32 bits. Hence, the control processor 20 reads data stored at one address specified by the address pointer 50 in an order in several reading operations. The memory banks BMEM0 and BMEM1 are configured to have different input/output data widths for writing signals on the trace bus TBS thereinto and for reading data by the control processor 20.

Figure 7A:
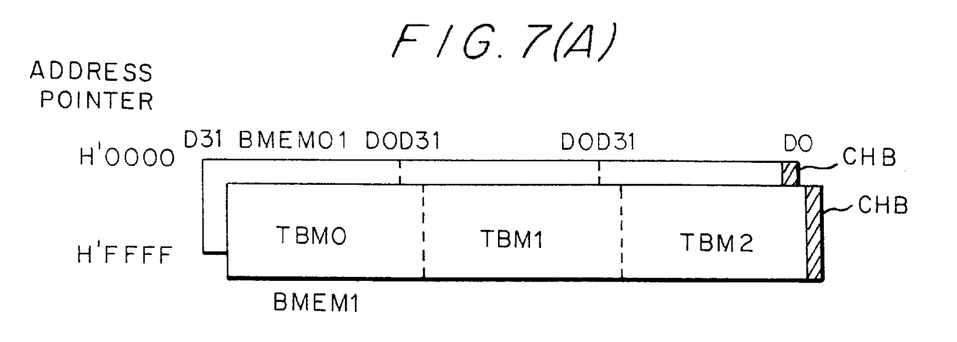
FIG. 7(A) illustrates an address map configuration of the memory banks in writing mode.

That is, each memory bank BMEM0 (BMEM1) has the data width of 96 bits when signals on the trace bus TBS are written thereinto, as shown in FIG. 7(A) for example, and is located in an address space such as of H'0000-H'FFFF in hexadecimal notation. In the reading process by the control processor 20, as shown in FIG. 7(B), the memory bank BMEM0 has a 32-bit data width and is located in an address space such as of H'100000-H'1BFFFF in hexadecimal notation and the memory bank BMEM1 has a 32-bit data width and is located in an address space such as of hexadecimal H'1C0000-H'27FFFF.

Figure 7B:
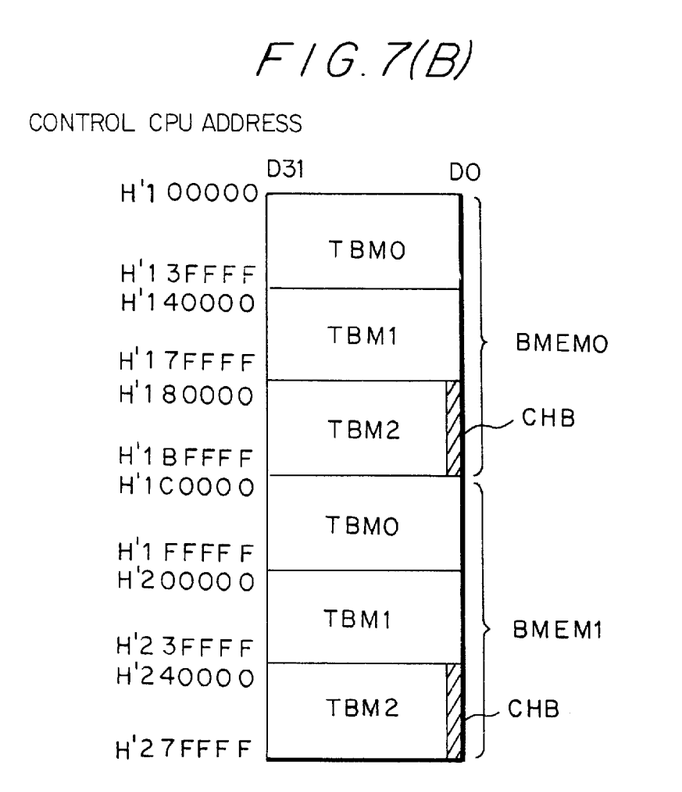
FIG. 7(B) illustrates an address map configuration of the memory banks in reading mode.

In FIGS. 7(A) and 7(B), the memory configuration is such that memory areas TBM0 are used to store address signals on the trace bus TBS therein, memory areas TBM1 are for storing data signals on the trace bus TBS therein, and memory areas TBM2 are for storing control signals and status signals on the trace bus TBS therein. In FIGS. 7(A) and 7(B), areas CHB are data areas (flag bit FB storing areas) where the flag bits FB are stored. The address map configuration of the memory banks is not limited to the example shown, but can be modified as desired according to the capacity of the memory used and the number of signals to be acquired.

Figure 8:
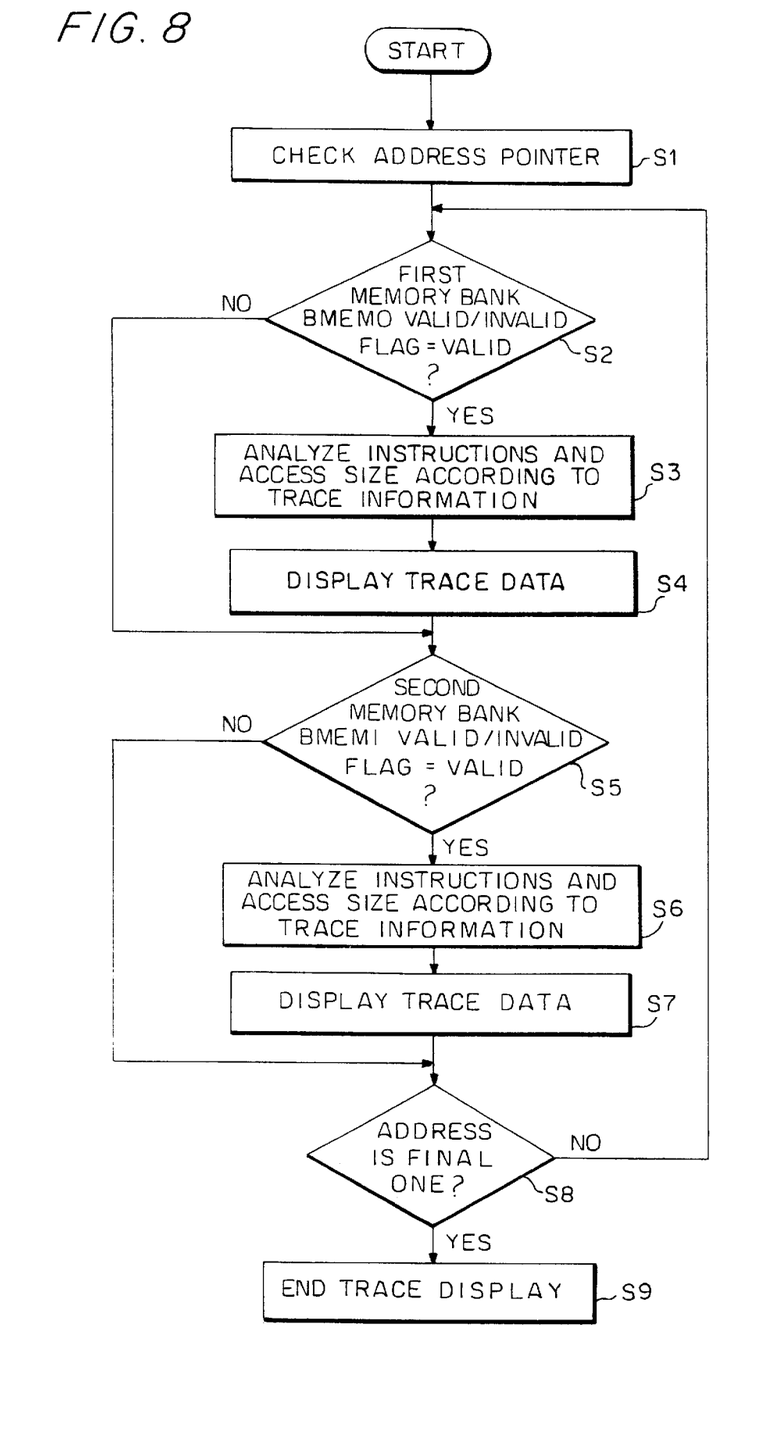
FIG. 8 is a flowchart illustrating the procedure to display on a monitor the data traced in the memory banks in the emulator of FIG. 1.

FIG. 8 illustrates the detailed sequence of operations of the emulator when displaying data traced in the memory banks BMEM0 and BMEM1.

The control processor 20 first reads the value of the address pointer 51 to check a trace data display end address (step S1). Next, it reads data of the start address (or the address next to the previous trace end address) in the first memory bank BMEM0 to check if the valid/invalid flag FB indicates a valid state "1" (step S2). If the flag FB indicates the valid state, the control processor 20 analyzes the trace data based on the information about the data size and the status information representing whether instructions have been executed, these information being included in the trace data read out (step S3). Then, the control processor 20 sends the results of analysis to the host computer 80 to display them on the monitor screen (step S4).

When, on the other hand, the valid/invalid flag FB of the trace data read out from the first memory bank BMEM0 indicates invalidity, the processing of the control processor 20 jumps from step S2 to step S5 where it reads data of the first address in the second memory bank BMEM1 to check the valid/invalid flag FB. If the flag FB indicates the validity, the control processor 20 analyzes the trace data according to the information about the data size and the status information representing whether or not instructions have been executed, these information being included in the trace data read out (step S6). The results of analysis are sent to the host computer 80 to display them (step S7). When the valid/invalid flag FB of the trace data read out from the second memory bank BMEM1 indicates invalidity, the processing of the control processor 20 jumps from step S5 to step S8 where it updates the address and judges whether or not the updated address is the one corresponding to the end address of the trace (step S8). If the address is not the end address, the processing of the control processor 20 returns to step S2 where it reads the next data from the first memory bank BMEM0. The above procedure is repeated and when at the step S8 it is judged that the address read out is the end address, the display of trace data is ended (step S9).

As described above, the above embodiment has the trace memory formed of a plurality of memory banks and includes a control circuit that in principle stores trace data sequentially in each memory bank. It also includes a trace condition setting circuit or means and a trace condition agreement detection circuit or means for generating a valid/invalid bit or data FB indicating whether the trace data is valid data that has met the trace condition or invalid data that has failed to meet that condition, and to store the valid/invalid bit FB along with the trace data in each memory bank. Because of this arrangement, each memory bank is accessed only once for every several times, which in turn makes it possible to take in signals on the bank buses without data loss even when the trace memory access time is long compared with the operation frequency of the microcomputer. At the same time, because a valid/invalid flag FB is attached to the trace data and they are stored, the order in which the trace data have been stored in the trace memory is prevented from being lost.

The addresses of the respective memory banks of the trace memory are generated by a common address counter circuit, whose value is updated when the valid data are stored in one of the memory banks and not updated when the invalid data are stored in all the memory banks. This prevents many invalid data from being stored in the trace memory, thus improving the efficiency of the utilization of the trace memory.

The present invention has been described in detail in conjunction with an embodiment. It is noted, however, that the invention is not limited to the above embodiment but that various modifications may be made without departing from the spirit of this invention. For example, while the trace memory of the embodiment is formed in two memory banks, the number of the memory banks may be three or more.

As the above trace condition, for example, addresses are used. In this case, address data representing the addresses to be traced are set in the register 42 by the control processor 20. Then, the above-mentioned tracing is performed.

In the above embodiment, two pairs of registers 42 and comparators 43 are provided (for BMEM0 and BMEM1). Other configurations may be used. For example, for each of the memory banks (BMEM0 and BMEM1), two pairs (two registers and two comparators) may be provided. This arrangement makes it easier that a desired space (address space) is made an object to be traced.

For example, data on the higher order address of the space to be traced is set in a register in either of the two pairs and the lower order address is set in a register of the other pair. With this setting, it is possible to perform tracing of the space specified by the two registers (space between the lower order address and the higher order address). It is also possible to trace a space higher than the higher order address and a space lower than the lower order address. In this case, two comparators provided one for each bank may be commonly fed with the above control signal CMPEN0 (CMPEN1) and the outputs of the two comparators be logically ORed to generate the signal WRV0 (WRV1). Further, the signals of these two comparators may be fed to the address pointer control circuit 70. In this case, the outputs of a total of four comparators are sent to the address pointer control circuit 70.

The connection to the host computer 80 is not limited to the one using serial communication. For example, the CPU bus may be directly connected to the host computer or through LAN (Local Area Network).

The above description has been made, taking the case where the present invention is applied to a user system emulator using a microcomputer in the field of application of the invention, which is the background of the present invention. This invention is not limited to this application but may be applied to the designing of a circuit for acquiring signals on the bus in a microcomputer system.

The advantage brought about the representative of the invention is as follows.

An emulator can be realized such that desired data can be stored efficiently in the trace memory and the order in which the data have been taken into the trace memory can be maintained.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. An emulator comprising:
    a plurality of memory banks which selectively store signals present on a first bus of a system to be evaluated;
    a trace control unit having a trace condition setting circuit, in which a trace condition is set, and a trace condition agreement detecting circuit which generates data indicating whether or not signals on said first bus meet the trace condition; and
    a control circuit which controls accessing of the plurality of memory banks so as to store the signals on said first bus and the data from said trace condition agreement detecting circuit alternately and sequentially in the plurality of memory banks,
    wherein said control circuit includes an address generating circuit which generates addresses for accessing a memory bank in said plurality of memory banks, said address generating circuit generating different addresses when said trace condition agreement detecting circuit generates data indicating that signals on said first bus meet the trace condition stored in said trace condition setting circuit.

2. An emulator according to claim 1, wherein said trace control circuit comprises:
    a plurality of trace condition setting circuits each of which corresponds to each of said plurality of memory banks and stores a trace condition which is set; and
    a plurality of trace condition agreement detecting circuits each of which corresponds to each of said plurality of trace condition setting circuits and generates data indicating whether or not signals on the bus meet the trace condition stored in the corresponding trace condition setting circuit,
    wherein said address generating circuit generates different addresses if at least one of said plurality of trace condition agreement detecting circuits generates data indicating that signals on said first bus meet the trace condition and does not generate the different addresses if no trace condition agreement detecting circuit in said plurality of trace condition agreement detecting circuits generates data indicating that signals on said first bus meet the trace condition.

3. An emulator, comprising:
    a plurality of bank memories which selectively store signals present on a bus of a system to be evaluated;
    a trace control circuit which generates data indicating whether or not signals on the bus meet a trace condition; and
    an address generating circuit which generates addresses for said plurality of memory banks, so as to store signals on the bus alternately and sequentially in said plurality of memory banks,
    wherein the address generating circuit generates different addresses if said trace control circuit generates the data indicating that signals on the bus meet the trace condition, and
    wherein the generation of the different addresses by said address generating circuit is inhibited if said trace control circuit does not generate the data indicating that signals on the bus meet the trace condition.

4. An emulator according to claim 3, wherein said address generating circuit generates the different addresses if said trace control circuit generates the data indicating that signals on the bus meet the trace condition and continues generating the present addresses if said trace control circuit does not generate the data indicating that signals on the bus meet the trace condition.

5. An emulator according to claim 4, wherein said address generating circuit includes a counter and wherein said counter is updated if said trace control circuit generates the data indicating that signals on the bus meet the trace condition.

6. An emulator according to claim 5, wherein said trace control circuit comprises:
    a trace condition setting circuit which stores a trace condition; and
    a trace condition agreement detecting circuit which generates data indicating whether or not signals on the bus meet the trace condition.

7. An emulator according to claim 5, wherein said trace control circuit comprises:
    a plurality of trace condition setting circuits each of which corresponds to each of said plurality of memory banks and stores a trace condition, and
    a plurality of trace condition agreement detecting circuits each of which corresponds to each of said plurality of trace condition setting circuits and generates data indicating whether or not signals on the bus meet the trace condition stored in the corresponding trace condition setting circuit, and
    wherein said counter is updated if at least one of said trace condition agreement detecting circuits generates the data indicating that the signals on the bus meet the trace condition and wherein said counter is not updated if said plurality of trace condition agreement detecting circuits generates do not generate the data indicating that the signals on the bus meet the trace condition.

* * * * *